United States Patent Office 3,514,518
Patented May 26, 1970

---

3,514,518
PROCESS FOR PREPARATION OF GELATINOUS MATERIAL FROM ANIMAL COLLAGEN
Pierre Charier-Vadrot, 1 Rte. de Lagnes,
Cavaillon, Vaucluse, France
No Drawing. Filed Dec. 19, 1967, Ser. No. 691,726
Int. Cl. A23j *1/10;* C08g *1/06;* C09h *3/00*
U.S. Cl. 424—360                                     10 Claims

ABSTRACT OF THE DISCLOSURE

Gelatin and equivalent gelationous products that are cold water soluble and heat resistant are prepared from a source material, such as animal collagen or marine or vegetable colloids, by subjecting the source material, either directly or following a pretreatment, to low temperature freezing followed by lyophilization. The lyophilization may be performed by radiant heating of the product to about 100° C.

BACKGROUND OF THE INVENTION

It is well known to prepare gelatin or similar material from animal collagen or from marine or vegetive colloids, e.g., see French Pat. 1,278,490 which concerns preparation of collagen from hides or ossein. According to this process, hides are covered with water containing hydrogen peroxide and then the collagen thus obtained is treated with an acid. This produces a gelatin said to be well suited for uses as food products because of the bactericidal properties of the hydrogen peroxide. Further, the patent states that the gelatin is water soluble, this result being attributed to the division of the collagen molecules into small fragments.

A process has also been disclosed in U.S. 2,166,074 for the preparation of gelatin that is water soluble at a relatively low temperature. According to this process, gelatin is dissolved in water and the product is lyophilized. However, only a small quantity of gelatin (of the order of 2%) may be dissolved in a large amount of water (of the order of 98%), which must be eliminated by freeze-drying, which is expensive and hardly commercially attractive.

It is further known that marine colloids such as algae, or vegetable colloids such as gums, may be converted by a variety of methods to produce agars, carragheenates, alginates, karayas, gum arabic, tragacanth gum or the like. Such products are, however, both chemically and physically different from gelatin either as known heretofore or as produced by these new methods disclosed herein.

Although these prior known methods are capable of producing gelatin that has been lyophilized and is water soluble, there is a need in the industry for further improvements both to the gelatin itself and the methods for its production. As to product improvements, there is need for improved heat resistance and cold water solubility. As to process improvements, there is need for reduction in costs, improved efficiency and reduction in quantities of materials handled or involved in the operations.

OBJECTS

A principal object of this invention is the provision of new improvements in the preparation of gelatin and equivalent gelatinous products.

Further objects include the provision of:

(1) New forms of gelatin that are cold water soluble and have good heat resistance.

(2) New processes for lyophilization of gelatin or equivalent gelatinous products.

(3) New forms of gelatin suitable for use in food products such as mayonnaise, custard, soup and dehydrated sauces.

(4) New methods of preparing gelatin from animal collagen or other source materials.

(5) New forms of gelatin especially suitable for preparation of capsules, suppositories and other pharmaceutical use.

(6) Production of gelatin particularly suitable for use in the preparation of photographic film, especially such film intended for use in hot moist climate.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

A first form of the process of the invention is applied to so-called "primary" products or source material obtained from collagens that have already undergone one or more of the following preliminary treatments which are standard and which therefore, are not part of the invention.

The said preliminary treatments comprise three phases which will be described below and which, for later clarity of language will be designated as phases A, B and C.

Phase A

If bones are used as primary material, they are defatted, dried, acidified by a weak acid to eliminate mineral matter and then the product is limed, washed and rinsed in a slightly acid solution. If hides are used as starting material, it is obviously not necessary to carry out the acid demineralizing step.

Phase B

As an alternative, bones or skins are first dissolved in the conventional manner and the said solution is filtered and rapidly concentrated at low temperature. Then the gel thus obtained is poured out and dried, reserving to it, however, a water content of the order of 20%.

Phase C

After having effected the operations as in phase A, the product is cooked at a relatively low temperature.

The term "source material" as used anywhere in this disclosure or the accompanying claims means any suitable source of gelatin, such as raw bones, hides or the like, or such materials that have undergone any of the preliminary treatments mentioned above or their equivalent and also sources of gelatinous material such as marine or vegetable colloids.

The process of the invention is characterized substantially in that the primary product that is obtained is frozen and then lyophilized.

If the primary product is obtained by phases A or C, before proceeding to the lyophilization, the product should be ground and 5 to 10% water should be added to make a paste. Such step is unnecessary if the primary product was obtained by phase B.

As a matter of choice, and if it is desired to impart a good cold solubility as well as good heat stability to the gelatin, a small proportion of a weak acid and a sucrose ester, such as sucrose monostearate, is added to the primary product. It is also possible to add hydrogen peroxide if desired, to make a translucent gel. The sucrose ester advantageously is used in an amount of the order of 0.1% by weight of the primary product.

The weak acid that is used can be, for example, citric acid or lactic acid, and its proportion may be as high as 5% by weight of the total primary product and water and especially of the order of 0.5% by weight.

The hydrogen peroxide can be added in a proportion of approximately 3% and the sucrose ester in a proportion of up to 1% and especially of the order of 0.3%.

It should be noted that since the proportion of water in the primary product does not exceed about 10%, in contrast to known processes, the amount of water to be eliminated by lyophilization is not great, so that this step can be effected economically.

The freezing that precedes the lyophilization per se can be effected at a temperature as low as about −40° C., in a period that may be as much as about one hour.

Lyophilization is advantageously accomplished in a tray compartment, in the following preferred conditions:

Loading density on the trays: 10 kg./m.$^2$
Compartment pressure: less than 1 torr
Heating, preferably by radiation, to a temperature of the order of 100° C. at the start of the process and then gradually lowered to about 40° C.

The lyophilized product is advantageously stored in a sealed container, preferably in an inert atmosphere in order to maintain protection against oxygen and dampness.

The gelatin that is obtained by the process of the invention can be heated without difficulty to a temperature of the order of 125° C., for more than one hour, and it thus resists sterilization. After cooling, it comprises a gel that is stable at a temperature above 37° C. which is an essential advantage with reference to gelatins used heretofore which cannot withstand this temperature.

Furthermore, as has been stated, this gelatin is soluble in cold, so that it can be used for food products such as mayonnaises, custards, soups and dehydrated sauces, etc.

Thus, by adding about 1/10,000 malic acid before lyophilization, a gelatin is obtained which has in addition to heat stability as great as that of gelatin produced by known processes, a great protective colloidal capacity and low moisture take-up. The product also appears to have improved sensitivity that makes it a photographic film type gelatin, particularly for films intended for use in hot moist climates.

If a gelatin more particularly useful for preparation of capsules or suppositories for pharmaceutical use is desired, the 1/10,000 malic acid addition is replaced by an addition of 1% natural gum such as powdered karaya gum, or by a 1% addition of dextrose.

A second embodiment of the process for preparation of gelatinous products according to the invention may also be described. These products which are especially useful in the food industry, are made from marine or vegetable colloids.

As previously mentioned, marine colloids such as algae, or vegetable colloids such as gums, may be treated by various known processes to yield agars, carragheenates, alginates, karayas, gum arabic, tragacanth gum, etc., in a pasty or moist form which is then dried.

The second form of the process of the invention is characterized essentially in that there is incorporated in the primary products thus obtained a mixture composed of the following elements:

About 3 to 5% of a weak acid,
About 3% sodium chloride,
About 1% 95% ethyl alcohol,
And the secondary product thus obtained is then lyophilized.

The weak acid may be, e.g., citric acid, preferably in a proportion of 5%, or lactic acid used preferably in a proportion of 3%.

The mixing operation of the invention can occur either before or after the drying of the primary product. In the latter case, the mixing is accompanied by vigorous grinding, preferably with a light water spray.

In both cases, the lyophilization is effected as described above the reference to preparation of gelatin from collagens.

The present invention is also related to culinary preparations based on products prepared according to this second embodiment of the invention.

For the preparation of a custard base, the gelatinous products obtained in accordance with the invention may be mixed with glucose, starch and powdered egg yolk. For the preparation of a gel base for desserts or other foods, a small amount of sucrose ester, such as sucrose monostearate, is added to the gelatinous product of the invention.

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

The primary product which is ossein was prepared from bones by the known process designated as phase A.

After washing, the ossein was ground until it could pass through a so-called number 60 mesh sieve. Five percent water was added, then 0.5% lactic acid and 0.3% hydrogen peroxide to twenty volumes. Freezing at −40° C. for one hour, followed by lyophilization in a tray compartment.

The product was added to meat (corned beef), sterilized at 125° C. for one hour and 20 minutes. After unmolding, a block of meat was obtained that held together perfectly and could be cut into thin slices at a temperature of 37° C. This block was perfectly stable at this temperature for at least four hours.

EXAMPLE 2

0.1% sucrose monostearate was incorporated in a primary gelatin obtained in the conventional manner. The product was dried, ground, and then 5% water was added to bring the total moisture content to 16%. The product was then frozen at −40° C., then lyophilized as above. A powdered product was obtained, 2% of which was introduced into 20° C. water. The powder immediately dissolved, after which it was held at +8° C. for 20 minutes, which procedure yielded a clear light jelly. 6.7% gelatin could have been introduced into the water instead of 2% with equivalent results.

EXAMPLE 3

This example concerns the use of gelatinous product of the invention made from marine or vegetable colloid in the preparation of a base for custard.

Heretofore such bases were prepared only from agaroids, which imparted to the cream that is obtained a stiff unnatural texture, and they have been expensive.

In contrast, a custard base according to the present invention can be prepared by the mixing of the following ingredients:

Agaroid such as carragheenate: 50 parts
Karaya gum: 50 parts
Glucose: 50 parts
Cornstarch: 25 parts
Dried egg yolk: 25 parts
Sodium chloride: 6 parts The mixture is then pulverized.

A base prepared in this way allows preparation of a custard that has a better taste than that prepared by known processes, a texture that approximates that of a home made product, and a cost that is about 35% less than that of known products.

EXAMPLE 4

This example concerns a gel base made from marine and vegetable colloids treated in accordance with the present invention as described above.

A gel base was prepared from the following ingredients:

Marine colloids: 150 parts
Vegetable colloids: 150 parts
Sodium chloride: 6 parts
Citric acid: 3 parts
Sucrose monostearate: 0.5 part A gel prepared in this manner is easy to use, has good taste properties, retains aromas well, and costs about 40% less than gels obtained by known processes.

The embodiments of the invention in which an exclusive property or right is claimed are defined as follows:

1. A process for the preparation of a gelatinous product that is cold water soluble and possesses good heat stability which comprises:
   (a) providing a source of collagenous material,
   (b) adjusting the water content of said material to a maximum of 10%,
   (c) subjecting said material of step $b$ to low temperature freezing, and
   (d) subjecting the product obtained from step $c$ to lyophilization by heating such product to a temperature about 100° C. and then gradually reducing the temperature to about 40° C.

2. A process as claimed in claim 1 wherein said low temperature freezing is conducted at about −40° C.

3. A process as claimed in claim 1 wherein said low temperature freezing is applied to said material for about one hour.

4. A process as claimed in claim 1 wherein a small amount of a weak acid and a small amount of sucrose ester is added to said material before said low temperature freezing.

5. A process as claimed in claim 4 wherein citric acid in an amount about 0.5% based on the weight of said material and sucrose monostearate in an amount of about 0.1% on the same basis is added to said material before said low temperature freezing.

6. A process as claimed in claim 1 wherein said step $d$ is performed by radiant heating of the product of step $c$ with said product spread out upon a flat support surface at a loading density of the order of 10 kg. per sq. meter.

7. A process as claimed in claim 1 wherein the resulting product is particularly adapted for capsules or suppositories for pharmaceutical use by the addition of about 1% natural gum to said material before said lyophilization.

8. A gelatinous product that is cold water soluble and possesses good heat resistance as prepared by the process of claim 1.

9. A process for the preparation of a gelatinous product that is cold water soluble and possesses good heat stability which comprises:
   (a) providing a source material consisting essentially of animal collagen containing a small amount of a weak acid and a small amount of a sucrose ester,
   (b) adjusting the water content of said source material to a maximum of 10%,
   (c) subjecting the source material of step $b$ to freezing at a temperature about −40° C., and
   (d) subjecting the product obtained from step $c$ to lyophilization effected by spreading the product on a flat support surface at a loading density of the order of 10 kg. per sq. meter in a zone having a pressure less than 1 torr and radiantly heating the product to a temperature about 100° C. and then gradually reducing the temperature to about 40° C.

10. A process as claimed in claim 9 wherein the resulting product is particularly adapted for use as a component of photographic film by addition of malic acid to the animal collagen material before said lyophilization in an amount of about 1 part malic acid per 10,000 parts of said material.

References Cited

UNITED STATES PATENTS

| | | | |
|---|---|---|---|
| 2,024,683 | 12/1935 | Epstein et al. | 99—11 |
| 2,166,074 | 7/1939 | Reichel | 252—6 |
| 2,368,393 | 1/1945 | Zeigler | 260—118 |
| 2,392,297 | 1/1946 | Strenitz | 99—130 |
| 2,453,630 | 11/1948 | Kenyon et al. | 260—118 |
| 2,803,548 | 8/1957 | Hagerty | 99—130 |
| 2,824,807 | 2/1958 | Laster et al. | 99—130 |
| 2,834,683 | 5/1958 | Corben et al. | 99—130 |
| 2,838,402 | 6/1958 | Steigmann et al. | 99—130 |
| 2,841,498 | 7/1958 | Cahn et al. | 99—130 |
| 3,024,167 | 3/1962 | Damaskus | 424—101 |

FOREIGN PATENTS 13,682    1903    United Kingdom.

OTHER REFERENCES

Dictionary of Applied Chemistry, vol. V, 1941, Thorpe, pp. 504–505.

WILLIAM H. SHORT, Primary Examiner

H. SCHAIN, Assistant Examiner

U.S. Cl. X.R.

34—5; 96—114.7; 99—17, 124, 130, 139, 144; 260—117, 118, 209, 209.6